United States Patent Office 3,411,832
Patented Nov. 19, 1968

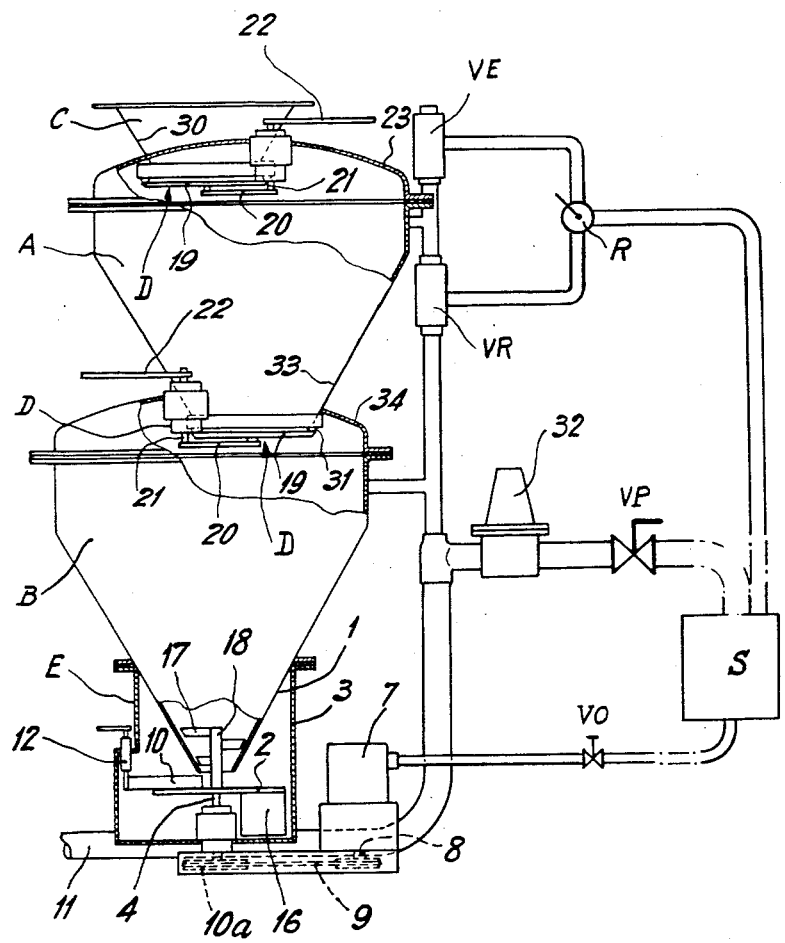

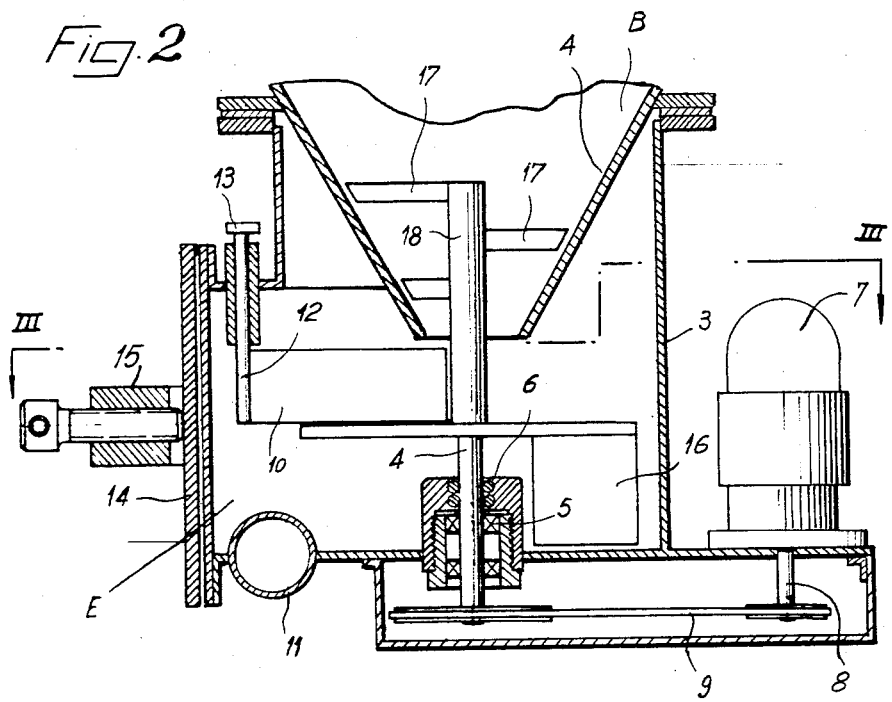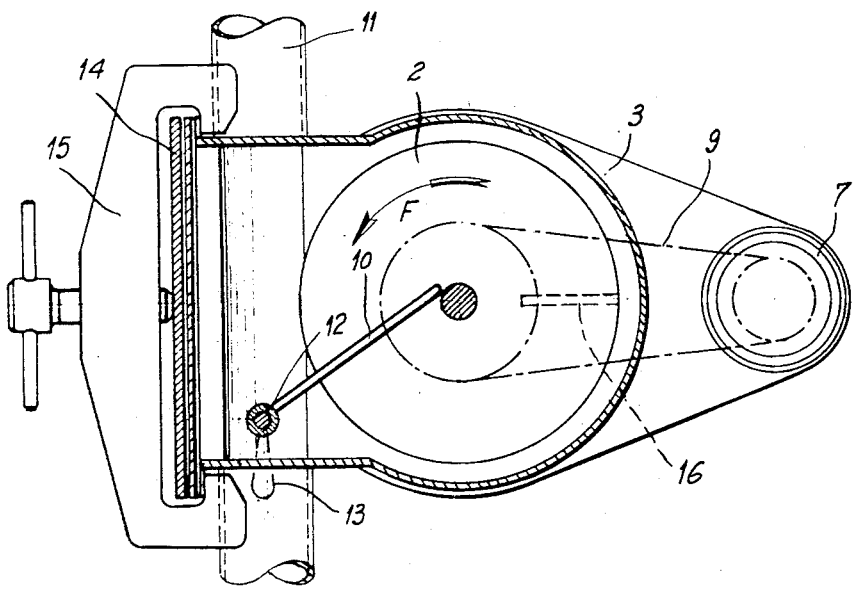

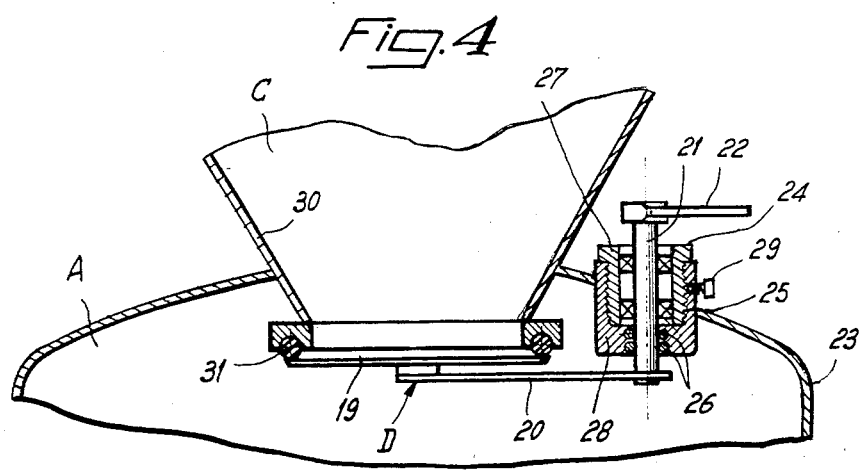
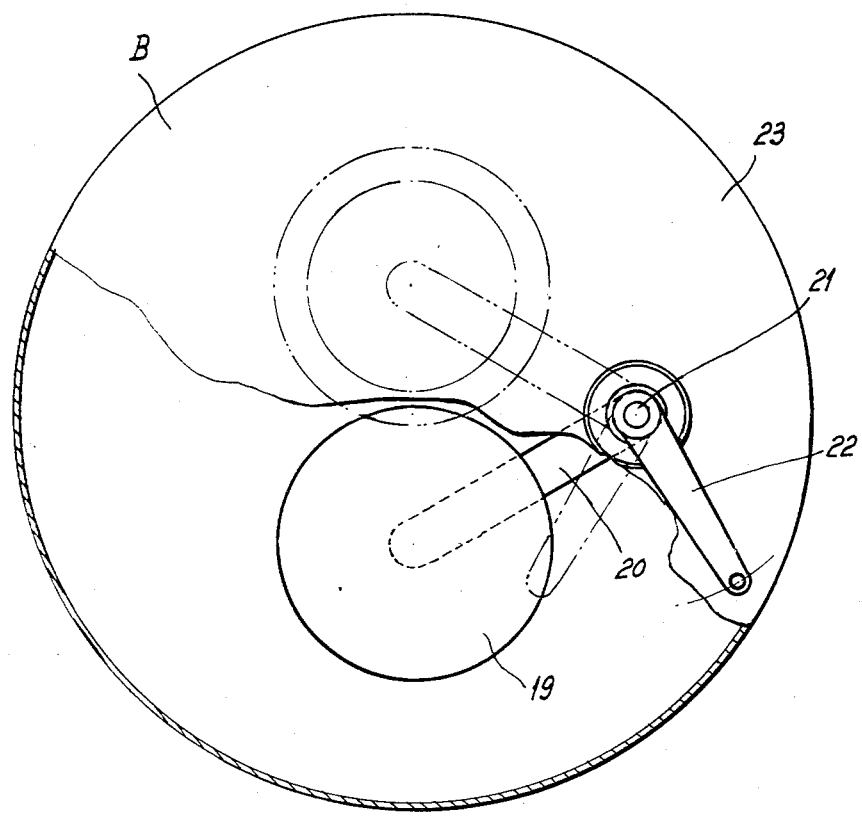

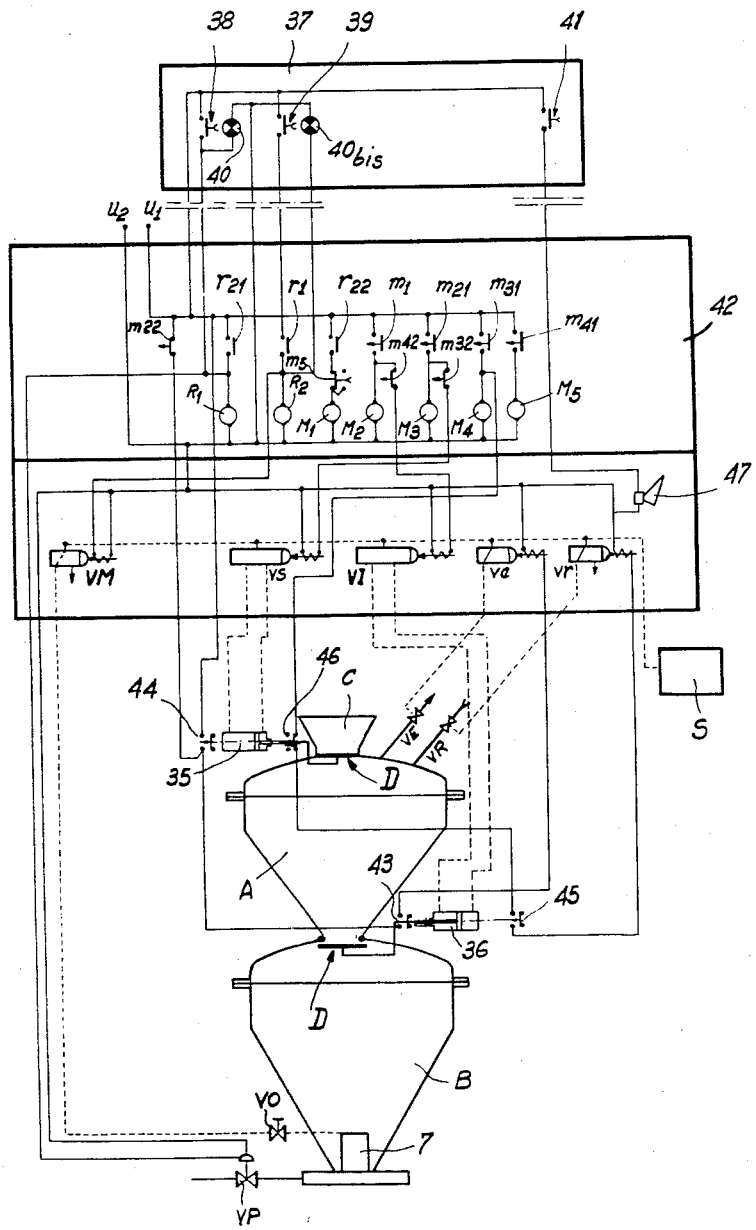

3,411,832
PNEUMATIC SPRAYING MACHINES
Jean Etienne Garreau, Ave. Marechal Joffre, Bougival, France, and Georges Henri Garreau, 10 Rue Sergent Bobillot, Nanterre, France
Filed Dec. 27, 1966, Ser. No. 604,805
Claims priority, application France, Jan. 8, 1966, 45,265
12 Claims. (Cl. 302—53)

ABSTRACT OF THE DISCLOSURE

A pneumatic spraying machine comprising a pressure-resistant tank, an inlet for receiving material to be sprayed, an outlet conduit, and a rotary shut-off member disposed below the inlet which is rotatable between positions in which it respectively uncovers and blocks the inlet, biasing means urging the shut-off member towards the inlet, a rotary distributor plate located above the outlet conduit, and a rotatable scraper arranged to sweep material from the plate into the outlet conduit.

---

This invention relates to pneumatic spraying machines.

In public works, e.g. for rendering facings, or for the construction of piers, tunnels, canals, reservoirs or swimming pools, in steel-making and foundries, for example for installing refractory linings in blast furnaces, ovens or ladles, it has become conventional practice to spray or project the material by means of compressed air.

Known spraying machines used for this purpose usually comprise a pressure-resistant tank having an expansion device and valves. Air is admitted at a pressure of 2–3 bars; and a distributing system allows the tank to be connected to a nozzle in which air and the material for spraying are mixed. The mixture is fed to an outlet nozzle held by an operator at the site. By means of a valve the operator controls the amount of water introduced into the mixture through annular ports. Components of appropriate shape and material protect the outlet nozzle from the abrasive effect of the materials carried.

Machines of this kind which comprise just one tank must, of course, be stopped when the tank is empty so that it can be refilled. This loss of time is avoided by the addition of a second tank situated above the first and used after the style of a sluice or lock.

The machine is filled and the two tanks are connected and the material to be sprayed flows from the top tank into the bottom tank and then to the conveying circuit. When the top tank is empty it is isolated from the bottom tank and connected to atmosphere. During this time the bottom tank empties into the spraying circuit while the top tank is filled and then pressurized; it is then reconnected to the bottom tank. In this way material can be sprayed continuously although it is fed to the machine in successive batches.

The distributors and the means for closing the top of the tanks as used at the present time in machines of this type have serious disadvantages.

Distributors with covers (discs having a reniform aperture and rotating against a stationary disc with a similar aperture) are likely to clog; it is difficult to regulate their delivery and the wear of the rotating components is considerable. Distributors with a bladed wheel forming radial cavities which are presented in turn beneath a nozzle so that their contents can be projected by a jet of air into the exit conduit have as their main disadvantage that they are unable to spray or project wet products since they clog the wheel. Finally, distributors which are simply in the form of a port of variable section through which the material drops simply by gravity have irregular rates of flow and are unsuitable for the use of products in the form of a fine powder because such products float and are very irregular in reaching the jet of air.

The most common known closure device consists of a bell controlled externally by means of a lever and supported on a rubber annular gasket situated above it, and this has the serious disadvantage that it can be effective only if the surface between the bell and the annular gasket is clear of any material. It cannot therefore close on load. With regard to the closure device consisting of a sliding trap guided in guides and applied to an annular gasket, although it allows on-load closure in principle, it is bulky and its adjustment is difficult.

The object of this invention is to seek to obviate the disadvantages of the known distributing and closure means of pneumatic spraying machines in a simple manner.

According to the present invention there is provided a pneumatic spraying machine comprising a pressure-resistant tank, a material inlet in said tank for receiving a charge of material to be sprayed, a distributor device, a material outlet conduit, and a rotary shut-off member which is disposed below said inlet, the said shut-off member being rotatable between a first position in which the said inlet is uncovered, and a second position in which the said shut-off member blocks said inlet, and biasing means for resiliently urging the said shut-off member in said second position towards said inlet.

Preferably a sealing ring is disposed around said inlet, the said shut-off member being arranged at all times to be in contact with said ring.

Said biasing means preferably comprises a resilient strip to carry said shut-off member, the strip being mounted on a shaft.

In a preferred embodiment, means may be provided for rotating said strip, and there are means for axially moving said shaft.

Said strip may be rigidly mounted on said shaft for rotation therewith, a fine-pitch screw thread mounting being provided for the shaft to adjust its axial position, the threads of said mounting being adapted to engage with threads of a bush which is rigidly secured to said tank.

Preferably said distributor device comprises a rotary plate adapted to be located above the said outlet conduit and to receive falling material from said inlet, and a rotatable scraper which is arranged to sweep said plate to remove material therefrom into said outlet conduit.

Control means may be provided for controlling the width of the plate swept by the scraper.

In a preferred embodiment, there are two pressure-resistant tanks superposed on one another, there being a said rotary shut-off member at the inlet of the tank adapted to be uppermost and another said shut-off member between the two tanks, and said distributor device is located adjacent the bottom of the tank adapted to be lowermost.

The distributor device and the two shut-off members may be manually operated. Alternatively, the distributor device and the shut-off members may be operated by motors.

Preferably, in the latter case, an electric system is provided for remote control of said motors, and said system may be arranged to provide for operation of said distributor device and said shut-off members by means of said motors in a predetermined sequence.

The motors are preferably pneumatic motors.

The invention will be illustrated, merely by way of example, in the accompanying drawings, in which:

FIGURE 1 is an elevational fragmentary view of a pneumatic spraying machine according to the present invention;

FIGURE 2 is a partial vertical section of the distributor for the spraying machine according to FIGURE 1;

FIGURE 3 is a section on the line III—III in FIGURE 2;

FIGURE 4 is a section showing part of the spraying machine provided with a shut-off device;

FIGURE 5 is a top plan view of the shut-off device of FIGURE 4, showing the operation of the shut-off device, and with some details omitted, and FIGURE 6 is a diagram of a remote-controlled system for controlling the operation of the spraying machine of the present invention.

Referring to the drawings, in FIGURE 1 there is shown a pneumatic spraying machine which comprises two superposed tanks A and B which can be brought into communication with or separated from one another by a shut-off device or trap having the general reference D. To this end, the shut-off device D is provided on the bottom frusto-conical part 33 of the top tank A, this part penetrating into the top part 34 of the other tank B. Also, tank A is connected at its top part 23 to a charging hopper C provided with a shut-off device D similar to the one separating the two tanks A and B.

At the bottom frusto-conical part 1 of tank B a distribution device is provided for the material which it is required to spray, and this device has the general reference E and is driven by a motor 7. The latter may be an electric motor but it is advantageous to use a pneumatic motor as shown in FIGURE 1 because of its flexibility of adjustment and its torque.

This motor is fed from a compressed air source S via an adjustable valve VO. By means of a valve VP and an expansion device 32 the source S also serves, firstly, a header 11 connected to the distributing device E and, secondly, the tanks A and B and the shut-off devices D. A valve VR is disposed between the expansion device 32 and the tank A and can also be brought into communication with the atmosphere via a valve VE. Finally, two shut-off devices D are respectively provided beneath the tanks A and B.

As will be seen in greater detail in FIGURES 2 and 3, the frustoconical part 1 of the lower portion of the tank B communicates with an annular chamber 3 which is disposed below the frusto-conical part 1 and is secured thereto. A smooth horizontal plate 2 is disposed in the chamber 3 beneath the frusto-conical part 1 and is keyed on a shaft 4 rotatable in the direction of arrow F in bearings 5 isolated from the chamber 3 of the tank by ring gaskets 6. The shaft 4 receives its drive from the motor 7, the shaft 8 of which is coupled to the shaft 4 via a belt or chain 9 passing round a pully 10a.

A scraper 10 is provided to remove material collected on the plate 2 and drop it into the header 11 which is open somewhat like a gutter at the bottom of the chamber 3. The scraper 10 is connected to a shaft 12 parallel to the shaft 4 and is provided with a control handle 13 for adjustment of its orientation and hence the width of the ring that it sweeps on the plate 2. An air-tight inspection door 14, held to its seat by a yoke 15, provides access to the interior of the chamber 3. Beneath the plate 2 is another scraper 16 to clean the bottom surface of the chamber 3 and to prevent any risk of clogging. Finally, an agitator is provided in the frusto-conical part 1 to keep the material it contains in a fluid state. This agitator is illustrated here in the form of blades 17 secured to a shaft 18 rigidly connected to the shaft 4.

The shut-off device or trap shown in FIGURES 4 and 5 comprises a plate 19, made, for example, of cast iron, secured to one end of a resilient strip 20 which is keyed on a shaft 21. The shaft 21 is borne by the top part 23 of the tank A, the shaft 21 having a control lever 22. The shaft 21 is mounted in bearings 24, 25 and ring gaskets 26 are provided for sealing the shaft 21. The bearings 24, 25 are contained in a bearing housing 27, made, for example, of steel. The housing 27 is externally provided with a fine-pitch screw thread and is screwed into a bush 28 having threads of the same pitch, said bush being secured, e.g. welded, to the part 23 of tank A. The vertical position of the strip 20 and of the plate 19 can thus be varied and the housing 27 can be locked by a pressure screw 29.

Plate 19 is intended to close the base 30 of hopper C through which the material is discharged into the tank A; to this end it is resiliently urged against an annular gasket 31, made for example of rubber, to provide a hermetic seal. As shown in FIGURES 4 and 5, the inside diameter of the gasket 31 is larger than that of the hopper opening so that the latter may be completely freed when the plate 19 still has an edge in contact with the gasket 31. In this way the plate 19 can be returned to the closed position without any risk of damaging the gasket 31. FIGURE 5 shows the shut-off device in full lines in the "hopper open" position, and in chain-dotted lines in the "hopper closed" position.

The trap interposed between the tanks A and B is similar to the one described above.

The pneumatic spraying machine (FIGURE 1) operates as follows. The tanks A and B are filled with the material for spraying and the trap separating the two tanks is opened, as are also the valves VP, VR and VO supplying compressed air to header 11 and the machine tanks and the motor 7. The material for spraying flows from the tanks and when the top tank A is empty the trap separating the tank A from tank B, and the valve VR, are closed, whereafter the valve VE and the trap for hopper C are opened. When tank A has been refilled, the latter trap is closed and then the valve VR and the trap between the two tanks are opened. This sequence of operations must be repeated whenever the top tank is empty.

In a first embodiment of the present invention, the shut-off devices D are controlled manually by means of levers 22 and the valves VE and VR are controlled pneumatically via cock R, the values VO and VP being conventional and manually controlled.

In a second embodiment according to the present invention, these operations can also be rendered automatic and remotely controlled, because the rotary shut-off devices, which can close on load, eliminate any need for inspection of the emptying of the tank A before it is isolated from tank B. Also, since the distributor E requires only a single control it can readily be controlled remotely, the speed of rotation of the motor 7 having been adjusted beforehand by means of the valve VO.

The shut-off devices D are controlled by pneumatic rams provided with electrical limit-indicating devices.

The introduction of compressed air into the rams is controlled by electro-pneumatic valves which are in turn controlled by electrical relays in accordance with a circuit described hereinafter; the valves VE and VR are also controlled pneumatically by a system of electro-pneumatic valves and electrical relays. The pneumatic motor 7 is controlled by an electro-pneumatic valve VM and the main air supply is controlled by an electro-valve VP (FIGURE 6).

The control system shown diagramatically in FIGURE 6 comprises a control box 37 having three press buttons operating electrical switches 38, 39 and 41, and two pilot lamps 40 and 40 bis. The box 37 is connected by a multi-core cable to a box 42 containing relays and electromagnetic time switches and also electro-pneumatic relays for controlling the various valves. The box 42 receives electrical power from the terminals $U_1$ and $U_2$ of an electrical source (not shown). The voltage will be preferably 24 or 48 volts for reasons of safety of the personnel using the machine.

Switch 38 is connected in series with a circuit which, inter alia, contains the control winding for the electromagnetic valve VP and disposed between the terminals $U_1$ and $U_2$. The relay $R_1$ is connected in parallel with the said winding and one of its ends is connected to the terminal $U_2$. The normally open contact $r_1$ of this relay is connected via switch 39 to terminal $U_1$ and via the winding of the electro-pneumatic valve VM to the terminal $U_2$. The lamps 40 and 40 bis denote the position of the switches 38 and 39. A relay $R_2$ is disposed between terminal $U_2$ and contact $r_1$ on the opposite side to the switch 39, a normally open contact $r_{21}$ of said relay being provided between $R_1$ and terminal $U_1$.

Electromagnetic time switches $M_1$, $M_2$, $M_3$, $M_4$, $M_5$ are also connected in parallel between $U_1$ and $U_2$. A second normally closed contact $r_{22}$ of relay $R_2$ and a normally closed contact $m_5$, which is arranged to have a delay on closing, of time switch $M_5$ are connected in series with time switch $M_1$. Similarly, the normally open contacts $m_1$, $m_{21}$, $m_{31}$ and $m_{41}$ are respectively connected in series with time switches $M_2$, $M_3$, $M_4$ and $M_5$.

The electro-pneumatic valves VM, VS, VI, $ve$, $vr$ and VP have a common terminal of their windings connected to $U_2$ while the other terminal of the winding of valve $vs$ is connected to a second normally closed contact $m_{32}$ of switch $M_3$ in parallel with the latter and the other terminal of the winding of VI is connected to a normally closed contact $m_{42}$ of switch $M_4$ in parallel with switch $M_2$. The free terminal of the winding of valve $ve$ is connected via a switch 43, which is controlled by the stroke of a ram 36 and via a switch 44 to terminal $U_1$. The normally closed contact $m_{22}$ of switch $M_2$ is disposed in parallel with switch 44. Similarly, the free end of the winding of valve $vr$ is connected via limit switches 45 and 46 for the rams 36 and 35 to a point situated between switch $M_4$ and contact $m_{31}$.

An acoustic warning device is provided between the terminals $U_1$ and $U_2$ and can be operated by closure of switch 41.

The control system is fed with compressed air from the source S via conduits shown in dotted lines in FIGURE 6.

Operation is as follows:

Actuation of press button 38 causes electromagnetic valve VP to open and air to be admitted to the spraying machine while relay $R_1$ is energised, its contact $r_1$ closing. Lamp 40 lights up to warn an operator that the operation has been executed.

The operator then actuates press button 39, the electro-pneumatic valve VM opens, admitting compressed air to the motor 7 at a rate of flow predetermined by the setting of valve VO. Closure of contact $r_1$ energises the relay $R_2$ which closes its contacts $r_{21}$ and $r_{22}$. The valves VP, VM and VR are then open, while the top shut-off device D controlled by the valve VS is closed. The time switch $M_1$ is then energised and set for a time corresponding to the time required for the emptying of the tank A. When the emptying is complete contact $m_1$ is closed and the time switch $M_2$ is set; the electro-pneumatic valve VI closes the bottom shut-off device D through the agency of ram 36 which actuates the limit switch 43. Limit switch 45 is closed actuating relay $vr$ which closes valve VR. The electro-pneumatic valve $ve$ then acts on the valve VE and the tank A is brought into communication with the atmosphere. Time switch $M_2$ then closes $m_{21}$ and the ram 35 is actuated by opening of the valve $vs$, so that the tank A can be filled. As it moves, ram 35 closes switch 44 and the electro-pneumatic valve $ve$ closes the valve VE. The time switch $M_3$ which had been energised on closure of contact $m_{21}$ acts on the electro-pneumatic valve VS which closes the top shut-off device D by means of ram 35 which actuates the switch 46, which in turn actuates the electro-pneumatic valve $vr$ to re-pressurise the tank A via the valve VR.

Simultaneously, time switch $M_4$ is set by contact $m_{31}$ and at the end of a predetermined time the contact $m_{42}$ controls opening of the bottom shut-off device D which is controlled by the ram 36 via the electro-pneumatic valve VI. At the same time, contact $m_{41}$ sets the time switch $M_5$ which resets $M_1$ for a new emptying process for the tank A.

This process is repeated for as long as there is no untoward incident or as long as the operator does not press the press button 39 to stop the motor 7 via the electro-pneumatic valve VM so that the flow of material in the spraying machine is stopped. The cycle is then interrupted.

The pilot light 40 bis then goes out to show that the order has been executed. The operator can actuate the press button 38 to close the valve VP and interrupt the supply of compressed air, lamp 40 then extinguishing.

The combination of the contacts $r_1$ and $r_{21}$ prevents any incorrect operation, i.e. closure of valve VP before motor 7 has stopped and conversely starting of said motor if the said compressed air valve is not open.

Another arrangement is devised in order to simplify the wiring and suppressing relay $r_1$ and $r_2$. Buttons 38 and 39 are replaced by a rotating commutator actuated at will by the operator. The first position opens electro-pneumatic valve VM, the second starts the sequence of operation (as described column 5, line 48 onward).

The complete spraying machine and its ancillary devices (expansion devices, filters, valves, control unit) can be mounted on a tubular or some other chassis and rubber-tired wheels to facilitate movement.

It will be appreciated that with the spraying machine of the present invention any material in powder or granular form can be continuously distributed regularly, the rate of flow can be controlled by simply adjusting the speed of the rotary plate without the use of an addition trap to control the output of the machine; also, any material which has fallen back (the wet fraction of the sprayed product which has not adhered to the surface intended to hold it) can be re-used immediately without any danger of clogging, while distributors employing covers and bladed wheel distributors allow this only after prior drying of such material and gravity distributors result in serious irregularities of operation if such material is to be re-used. Also, by means of the rotary shut-off plate 19, closure of the tank is possible in operation, because the trap can move without difficulty or damage through the stream of material and finally close tightly; furthermore, adjustment of this trap is possible much more quickly and easily than in the case of an ordinary trap having a rectilinear movement.

Another important advantage of the present invention is that since the rotary shut-off plate 19 can be closed under load, there is no need to check emptying of the tank before it is isolated; furthermore, once rotation of the motor driving the distributor plate 2 has been adjusted, only a single control is required in the distribution, and in this case the control is on the "all or nothing" principle; as the plate 2 is horizontal, stoppage of its rotation is followed practically instantaneously by stoppage of the material for spraying to the exit conduit.

In practice, just one tank may be provided which is equipped as described above and requiring stoppage for filling, if it has a tank which forms a lock to serve the tank carrying the combination of above means; the second tank may also be equipped with a rotary shut-off plate and annular gasket at the top.

We claim:

1. A pneumatic spraying machine comprising a pressure-resistant tank, a material inlet in said tank for receiving a charge of material to be sprayed, a resilient sealing ring disposed around said inlet, an outlet in said tank, a distributor device connected to said outlet, a material conduit connected to said distributor device, a substantially planar shut-off member which is rotatably mounted in said tank below said inlet, means to rotate said shut-off member in its plane between a first position in which said inlet is uncovered and a second position in which said shut-off member completely blocks said inlet, said shut-off member being arranged at all times to be in contact with said ring and biasing means for resiliently urging said shut-off member in said second position towards said inlet and sealing ring.

2. A machine as claimed in claim 1 wherein said biasing means comprises a resilient strip carrying said shut-off member at one end thereof.

3. A machine as claimed in claim 2 wherein said means to rotate said shut-off member comprises a shaft rotatably mounted on said tank, the other end of said strip being fixedly attached to said shaft for rotation therewith and means for axially moving said shaft.

4. A machine as claimed in claim 3 wherein said means for axially moving said shaft comprises a fine-pitch screw thread mounting on said shaft, bush means rigidly secured to said tank and having screw threads adapted to engage with the threads of said mounting.

5. A machine as claimed in claim 1 wherein said distributor device comprises a rotary plate located adjacent said outlet to receive material falling from said inlet, and a rotatably mounted scraper arranged to sweep said plate to remove material therefrom into said outlet conduit.

6. A machine as claimed in claim 5 further comprising means for rotating said scraper whereby the width of the sweep of the scraper over said plate is controlled.

7. A machine as claimed in claim 1 further comprising a second pressure-resistant tank having an inlet and an outlet and being superposed on said tank, a rotary shut-off member at the inlet of the uppermost tank and another shut-off member at the outlet-inlet between the two tanks.

8. A machine as claimed in claim 7 wherein the distributor device and the shut-off members are manually operated.

9. A machine as claimed in claim 7 further comprising motor means operatively connected to actuate the distributor device and the shut-off members.

10. A machine as claimed in claim 9 further comprising electric circuit means provided for remote control of said motors.

11. A machine as claimed in claim 10 wherein said circuit means is arranged to provide for operation of said distributor device and said shut-off members by means of said motors in a predetermined sequence.

12. A machine as claimed in claim 9 wherein said motor means are pneumatic motors.

References Cited

UNITED STATES PATENTS

| | | | |
|---|---|---|---|
| 1,206,112 | 11/1916 | Holbeck | 302—36 |
| 1,943,589 | 1/1934 | Domina | 302—55 |
| 2,124,018 | 7/1938 | Vogel-Jorgensen | 302—53 |
| 2,565,029 | 8/1951 | Kemper | 302—53 |
| 2,949,275 | 8/1960 | Pro | 302—55 |

ANDRES H. NIELSEN, *Primary Examiner.*